United States Patent
Hatton

[19]

[11] Patent Number: 5,835,324
[45] Date of Patent: Nov. 10, 1998

[54] PROGRAMMABLE ELECTRONIC FUSE BOX HAVING A KEY PAD WHICH DOES NOT REQUIRE FUSE ELEMENTS

[76] Inventor: Ken W. Hatton, 2129 W. Giddings, Chicago, Ill. 60625

[21] Appl. No.: 892,007

[22] Filed: Jul. 14, 1997

[51] Int. Cl.$^6$ ........................................... H02H 3/04
[52] U.S. Cl. .................. 361/93; 361/59; 340/638; 340/664
[58] Field of Search .................. 361/59, 91, 93; 307/10.1; 340/636, 638, 639, 663, 664

[56] References Cited

U.S. PATENT DOCUMENTS

| | | | |
|---|---|---|---|
| 4,202,025 | 5/1980 | Le Cardonnel | 361/103 |
| 4,751,605 | 6/1988 | Mertz et al. | 361/91 |
| 4,780,787 | 10/1988 | Dano et al. | 361/96 |
| 4,870,531 | 9/1989 | Danek | 361/93 |
| 4,991,042 | 2/1991 | Tokarski et al. | 361/93 |
| 5,101,316 | 3/1992 | Levain | 361/93 |
| 5,388,022 | 2/1995 | Ahuja | 361/94 |
| 5,404,049 | 4/1995 | Canada et al. | 327/525 |
| 5,409,402 | 4/1995 | Ball et al. | 439/621 |
| 5,420,561 | 5/1995 | Swensen | 337/365 |
| 5,442,589 | 8/1995 | Kowalski | 365/225.7 |

*Primary Examiner*—Jeffrey A. Gaffin
*Assistant Examiner*—Kim N. Huynh
*Attorney, Agent, or Firm*—Friscia & Nussbaum

[57] ABSTRACT

A electronic fuse box is provided with an input device such as a keypad with alphanumeric and data entry keys, a central processing unit made from one or more integrated circuits that is communicatively coupled to said keypad as well as a power switch assembly and a metering assembly. Application is achieved by connecting a power source to the electronic fuse box at the power switch assembly. Also, a plurality of external circuits are electrically connected to the electronic fuse box at the metering assembly.

20 Claims, 2 Drawing Sheets

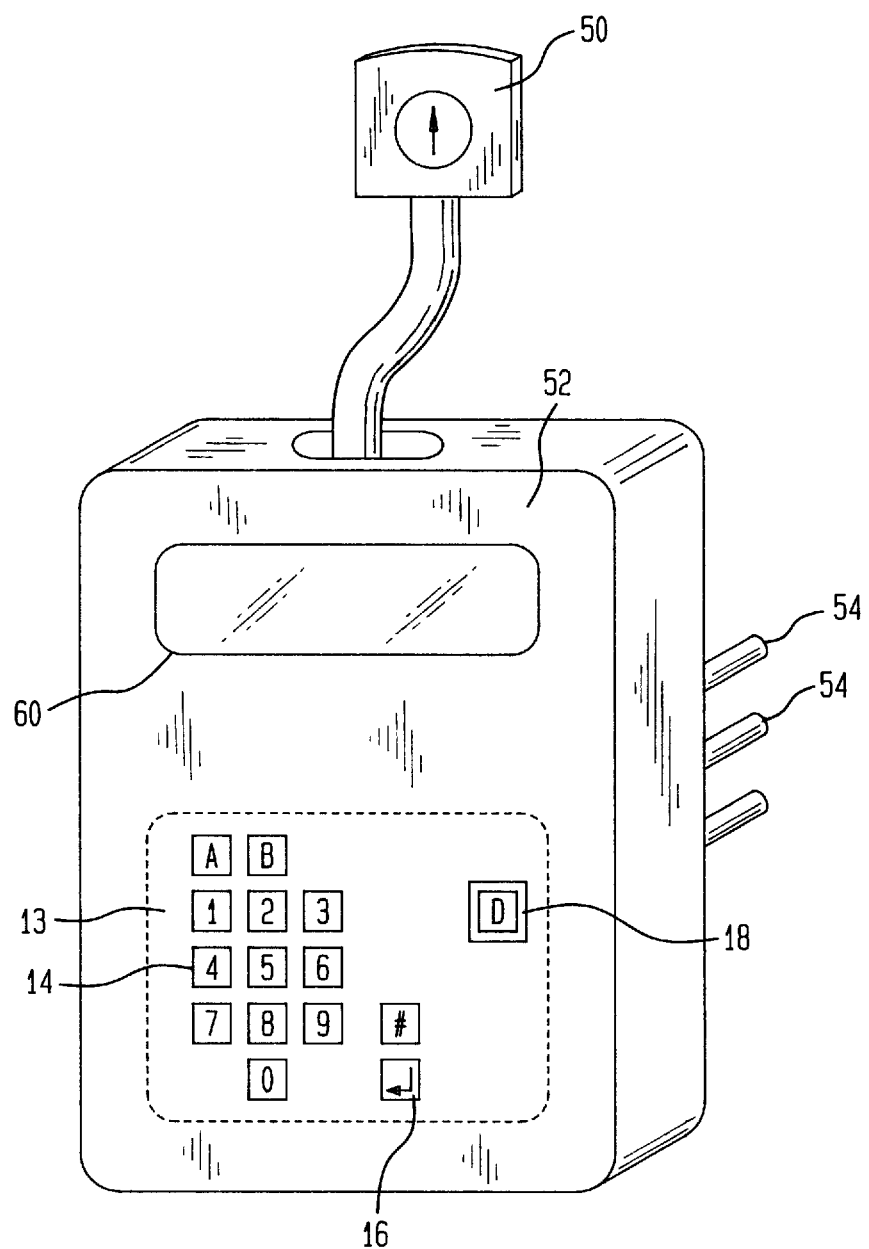

PROGRAMMABLE ELECTRONIC FUSE BOX HAVING A KEY PAD WHICH DOES NOT REQUIRE FUSE ELEMENTS

BACKGROUND OF THE INVENTION

1. Field of The Invention

This invention generally relates to a fuse box that electronically monitors electrical current through a circuit, and more particularly to an electronic fuse box that does not require conventional fuse elements to stop electrical current from flowing through a circuit.

2. Related Art

Means for protecting a circuit from excessive voltage or current is a necessary component of any electrical power supply system. In the past, fuses and/or circuit breakers have been used to physically and electrically disconnect the circuit from its power source whenever the voltage or current exceeds a predetermined level by opening the circuit. Opening the circuit is conventionally performed by mechanical means, and it is invariably necessary for human intervention to subsequently restore the circuit by either resetting the circuit breaker its operational position or removing the blown fuse and replacing it with a new fuse. This can be burdensome because it is difficult to reach and locate fuse and you could run out of fuses.

The conventional method of maintaining electrical safety protection is not without its limitations. Typically, even if the voltage or current requirements of a circuit should vary, the protection afforded to the circuit is limited by the fixed electrical and mechanical specifications of the fuse or circuit breaker. In other words, a fuse manufactured and specified to permit a certain current through its element cannot provide a lower level of amperage protection. Also, a circuit breaker which is manufactured to trip its relay apparatus at a predetermined magnitude of voltage will be ineffective at protecting a circuit when its safety requirements impose a lower voltage restriction. Such fixed limitations become particularly burdensome if the application and requirements of the circuit vary.

Given that circuits may have varying voltage or current requirements, it would be useful to develop a circuit protection device which could be programmed to open a circuit at a specific current or voltage level which could be changed by the user.

Examples of previous efforts at electronic fuse boxes include:

Ahuja, U.S. Pat. No. 5,388,022 discloses an auto-rest circuit breaker having at least one solid state switch (e.g. a triac, SCR or complimentary FET) that is biased to be normally closed and mounted in series with a shunt resistor or shunt resistor network. The shunt resistor creates a drop in voltage that is continuously measured, and may be converted from an analog to a digital value, to protect the circuit within the line from over-voltage or over-current conditions. Not relying upon thermal or electromagnetic relays, the circuit breaker provides instantaneous protection at an electronic speed.

Kowalski, U.S. Pat. No. 5,442,589 discloses a fuse circuit having a single physical fuse that is to be electrically blown and a non-volatile memory cell which confirms the condition of the fuse by measuring the current though a transistorized current divider network. Detection of a blown fuse is accomplished in the following manner: in the intact state, the low resistance of the fuse causes the current to bypass a parallel mounted transistor circuit and electrical ground. Should voltage overload conditions cause the fuse element to deteriorate, the resulting high resistance of the open fuse causes the current to reach electrical ground via the lower resistance path of the transistor circuit. The transistor circuit is preferably an Electrically Erasable Programmable Read-Only Memory (EEPROM) type floating gate transistor that is made of technology similar to that of the fuse.

Swensen, U.S. Pat. No. 5,420,561 discloses a circuit breaker or re-settable fuse device having a normally relaxed shape memory wire which receives heat from a resistor. Under prolonged overload current conditions, the resistor generated heat causes the shape memory wire to contract and shift a moveable terminal out of contact with a fixed stationary terminal, thereby interrupting electrical current in the circuit to be protected. Only when the overload conditions are removed does the current though the resistor drop to a point where the resultant heat is insufficient to maintain the contracted condition of the shape memory wire. The breaker or fuse thereby automatically resets itself.

Ball. et al., U.S. Pat. No. 5,409,402 discloses a device that houses a conventional fuse and permits installation without the use of tools. The interior of the rigid housing contains a pair of terminals and a fuse element that is positioned between these terminals by electrical contacts. Attached to the exterior of the housing are two plug portions, each of which extend in opposite axial directions, that are shaped for insertion and retention within the fuse socket. By removing or inserting the plug portion, the fuse is removed or installed within the circuit to be protected.

Canada, et al., U.S. Pat. No. 5,404,049 discloses a fuse blow circuit. The circuit includes an address buffer incorporated within a VLSI (Very Large Scale Integrated) semiconductor chip, which makes use of its existing input/output pads that are dedicated to other circuit functions, to determine the condition of fuses. Also included are a fuse latch chip, a fuse blow chip and a fuse sense chip. These three chips are required for each fuse used. A fuse control circuit is included and may be shared for a bank of fuses. The fuse sense circuit continuously tests a fuse by measuring a voltage drop across a resistor that receives a trickle current from a transistor. If an excessively high voltage opens a fuse element, the transistor becomes saturated. The fuse latch circuit determines if a fuse is to be blown or electrically overridden.

None of these previous efforts disclose all of the benefits of the present invention, nor do these previous patents teach or suggest all of the elements of the present invention.

OBJECTS AND SUMMARY OF THE INVENTION

It is a primary object of the present invention to provide an electronic fuse box.

It is another object of the invention to provide an electronic fuse box for opening a circuit without the need for a fuse element.

It is even another object of the present invention to provide an electronic fuse box which is programmable.

It is even another object of the present invention to provide an apparatus which can be programmed to open a circuit at a desired current.

It is even another object of the present invention to provide an electronic fuse box which does not need a fuse element.

It is still even an additional object of the present invention which measures and stores the magnitude of the current the exceeds the pre-set level.

It is even another object of the present invention to provide an apparatus that eliminates the need for replacement fuses.

It is even another object of the present invention to provide an apparatus that is easy to manufacture.

It is even another object of the present invention to provide a programmable fuse that is easy to program.

It is even another object of the present invention to provide an apparatus that is easy to operate.

It is yet another object of the present invention to provide an apparatus that is simple to reset.

It is also an object of the present invention to provide an apparatus which is able to discontinue electrical power to those external circuits which are experiencing excessive electrical operating conditions and maintain electrical power to those external circuits which are experiencing permissible electrical operating conditions.

These and other objects are achieved by the present invention which comprises a electronic fuse box having an input device such as a keypad with alphanumeric program keys, a central processing unit comprising one or more integrated circuits interconnected with keypad, a power switch assembly, a metering assembly, and connection means to for connecting electrical components to the electronic fuse box. A power source is interconnected with the electronic fuse box at the power switch assembly. A plurality of electrical components are electrically connected to the electronic fuse box at the connection means. The metering assembly can monitor either the voltage or current (amperage) to the electrical components and disconnect an electrical component from the power source when the voltage or current exceeds a specified amount.

The current to each electrical component can be pre-set. If the current is exceeded, the circuit is opened, and the magnitude of the current is measured and stored. The circuit can be re-set using the keypad.

BRIEF DESCRIPTION OF THE DRAWINGS

Other important objects and features of the invention will be apparent from the following Detailed Description of the Invention taken in connection with that accompanying drawings in which:

FIG. 2 is a perspective view of an embodiment of the electronic fuse box enclosed within a housing and having a attached keypad and electrical contact points.

DETAILED DESCRIPTION OF THE INVENTION

Figure 1:
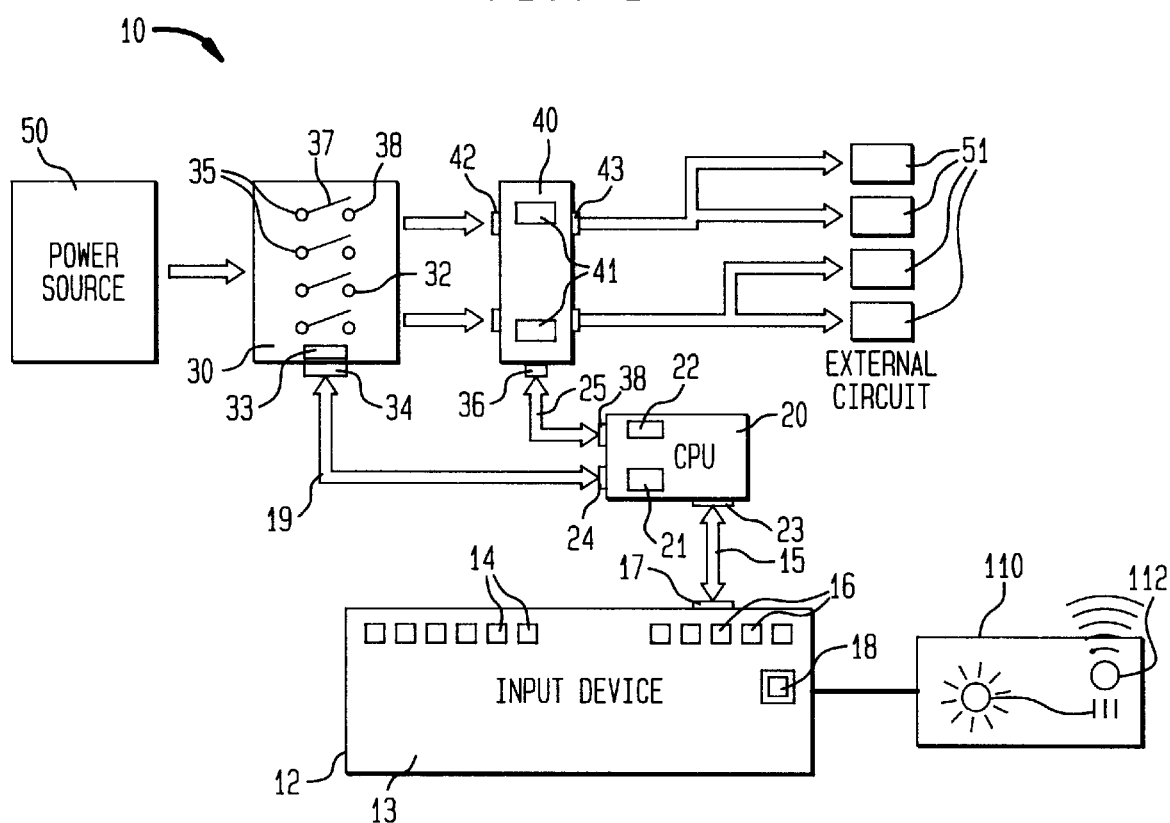
FIG. 1 is a block diagram of an electronic fuse box.

Referring to FIG. 1, the electronic fuse box of the present invention is generally indicated at 10. The electronic fuse box 10 comprises an input device or keypad, generally indicated at 12, a central processing unit 20 (hereinafter referred to by the abbreviation "CPU"), a power switch assembly 30 and a metering assembly 40. Further, a power source 50 is interconnected with the electronic fuse box 10 at the power switch assembly 30. Also, a plurality of electrical components, generally indicated at 51, are electrically connected to the electronic fuse box 10 at the connection means.

The input device 12 is preferably comprised of a keypad 13 having a plurality of alphanumeric keys 16 which can be pressed to construct coded programming commands and instructions. These commands and instructions, in their coded form, are transmitted as digital voltages from the input/output terminal 17 of the keypad 13, along a first data pathway 15 provided by one or more connecting wires, to be received at the first data input terminal 23 of the CPU 20. Of course, the first data pathway 15 may be provided as a digital bus comprised of a plurality of traces upon a printed circuit board.

The electronic fuse box 10 includes a CPU 20 which is preferably fabricated as an integrated circuit or a collection of interconnected integrated circuits. The internal architecture of the CPU 20 can be configured to provide one of two modes of initial operation: programmable or dedicated. In its programmable mode, the CPU 20 initially stores data which specifies the amperage monitoring parameters in its on-board random access memory (hereinafter referred to by its abbreviation, "RAM") 21. The RAM 21 can be formed within or without the integrated circuit in accordance with what is known in the art.

After data is entered, and the CPU 20 receives same, the CPU may generate a digital voltage which serves as a data-acknowledge signal. As is the practice in the art, the CPU 20 replies to the keypad 13 by transmitting the data-acknowledge signal to the input/output terminal 17 of the keypad 13, thereby completing a data-transfer communication.

Additionally, when the CPU 20 is initially programmed to operate in its dedicated mode, the CPU 20 acts according to a specified default configuration that is not dependent on any data or instructions entered through the alphanumeric keys 14 of the keypad 13. Instead, because the default configuration is fixed and not designed to vary according to the particularities of programming, it is possible to permanently store the configuration within the Basic-Input-Output-System (BIOS) of a read-only memory (hereinafter referred to by its abbreviation, "ROM") 22. Such a read-only memory 22 may be any EPROM or EEPROM as is known in the art. Further, to expedite the selection of the default configuration procedure, it may be initiated by the depressing of a single specially marked default data entry key 18 on the keypad 13.

The power switch assembly 30 is constructed by busing the power source 50 to a first set of contacts 35. These discrete mechanical points 35 may comprise the same electrical node and are the first terminals 36 of a set of switches 37. The power switch assembly 30 also includes a second set of discrete mechanical points 38 which do not comprise a singular electrical node. The second set of discrete mechanical points 38 are electrically connected to the first terminals 42 of a plurality of meters 41 which monitor the current supplied to the external circuits 51.

In the preferred embodiment of the present invention, the switches 37 are transistors which are suitably sized, rated and fabricated to accommodate the electrical power requirements of the power source 50 and satisfy the current requirements of the electrical circuits 51. Other embodiments of the switches 37 may include certain varieties of diodes, rectifiers, SCR diodes, bipolar junction transistors or such other active circuit components which are suitable sized, rated, biased or configured to accommodate the required electrical amperages and voltages.

When the electronic fuse box 10 is used in an automobile, the device switches 37 and meters 41 must both be capable of conducting amperages of up to 30 amperes, the maximum value of amperage that can be safely conducted by the conventional wiring of an automobile. When a power transistor or equivalent active circuit is used as the means to form a switch 37, the method of opening and closing the switch would be achieved by causing the CPU 20 to transmit data, comprised of one or more separate digital voltages, along the second data pathway 19, from its power switch assembly interface port 24 to the data input port 34 of the power switch assembly 30. Also concurrently transmitted would be any ancillary digital signals to the data such as a clocking pulse. Upon arrival of the data and its ancillary digital signals at the data input port 34, sequential logic circuitry 33 within the power switch assembly 30 would store the CPU's 20 instruction data to maintain the correct bias across the power transistors for an extended period of time, thereby freeing the CPU 20 from continuously maintaining the data and allowing the CPU 20 to perform other electronic tasks related to amperage monitoring. In the preferred embodiment, the sequential logic circuitry 33 may be suitably sized and configured collection of flip-flops such as a register or some other digital component or components which maintain sensitivity to clock pulse transitions. Once the sequential logic circuitry 33 of the power switch assembly 30 has stored the data transmitted from the CPU 20, the digital voltages comprising the various fields of the data would be applied to the base terminals of the power transistors to drive the transistors into either their cutoff or saturated states of operation.

Depending on the application of the electronic fuse box 10, these meters 41 may either measure direct current or alternating current.

Ideally, a single meter 41 is assigned to monitor the magnitude of the amperage traveling only through the electrical component 51 which corresponds to a single power transistor. In the preferred embodiment, these meters 41 have digitally enabled measurement means which not only indicate the magnitude of the actual electrical amperage and compare it to a predetermined value that has either been specified according to the particularities of programming or the dedicated default procedure, but said meters 41 also initiate the electrical component 51 protection procedure when the measured amperage exceeds the particular programmed magnitude. For purposes of safety, detection of any such overload conditions must be communicated from the metering assembly 40 to the CPU 20 in real time. Also, at the initiation of the external circuit 51 protection procedure, it may be advantageous to actuate a visual or auditory alarm 112 so than human attention is focused upon the overload condition.

Accordingly, it may be desirable to provide a third data pathway 25 between the power switch assembly 30 and the CPU 20. The third data pathway 25 could include means to transmit data indicating the detection and specific nature of the overload condition as well as any ancillary digital signals which include, but are not limited to, a data acknowledge signal to complete the data communication. Further, in the preferred embodiment, the internal architecture of the CPU 20 may be designed to recognize the detection of an electrical overload condition as an interrupt, discontinuing any data communication with the keypad 13 that might be currently in progress and immediately issuing a digital or otherwise electronic signal to the corresponding switch 37 to open itself so as to disconnect the power source 50 from the power switch assembly 30.

This detection and disconnection procedure is to be actuated for each external circuit 51 which experiences an overload condition. Should simultaneous overload conditions be detected by more than one meter 41, the CPU 20 may initiate the opening of switches 37 on a pre-programmed and prioritized basis. Such a scheme is best accomplished by establishing a hierarchial structure of prioritized interrupts. This hierarchial structure of prioritized inputs may be accomplished by either software coding or additional electronic hardware.

Also, to better facilitate communication along the second data pathway 19, both the data input port 34 of the power switching assembly 30 and the power switch assembly interface port 24 of the CPU 20 must include mechanical connection means which are sized and shaped to accommodate the necessary electrical hardware requirements.

Likewise, to better facilitate communication along the third data pathway 25, both the meter data input port 36 of the metering assembly 40 and the metering assembly interface port 38 of the CPU 20 also must include mechanical connection means which are sized and shaped to accommodate the necessary electrical hardware requirements.

Referring FIG. 2 to more conveniently install and otherwise use the above described electronic fuse box 10, it is preferable to enclose the CPU 20, the metering assembly 40 and the switching assembly 30 within a durable and electrically insulated housing 52. This housing 52 would preferably be comprised of plastic or some other insulating material which is sufficiently rigid to protect the internal components from accidental mechanical damage. To aid the technician or engineer in the installation of the electronic fuse box IO, it is necessary to uniquely extend the first terminals 36 of the power switches 37 to the first set of corresponding external electrical contact points 53 mounted on the outside of the housing 52. Accordingly, a second set of corresponding electrical contact points 54 would be electrically connected to the second terminal 43 of the meters 41 in the metering assembly 40.

Further, the size and shape of the housing 52 and the physical location of the first and second sets of electrical contact points 53 and 54 have import with regard to the installation of the electronic fuse box 10 within an existing power distribution circuit. By arranging the first and second set of contact points 53 and 54 so that they may be inserted within the electrical contact cavity of a conventional fuse receptacle, such as in an automobile, and make full electrical contact with such points, the electronic fuse box 10 may be used to replace or retro-fit an existing panel of fuses. This would be particularly desirable in automobile applications where the fuse receptacle is often located underneath the dashboard. Such a means for replacement would obviate the need to mechanically remove the existing receptacles as well as cut, trim, wrap and perhaps solder the existing wires. Accordingly, any method for replacing a fuse may include such a step prior to initiating any programming or configuring any electric circuit.

A method for protecting an external circuit 51 from overloading due to an excessive electrical amperage would initially require inputting at least one value using the alphanumeric keys 14 and data entry keys 16 on the keypad 13. Once entered, the CPU 20 would receive the coded instruction/command from the first data pathway 15 and thereafter perform the step of storing the commands and any related data indicating the magnitude of the predetermined amperage. This predetermined amperage would specify the magnitude of electrical current which the external circuit 51 could not exceed. Once the CPU 20 is programmed, the metering assembly 40 would begin monitoring the magnitude of an electrical amperage traveling from a power source 50 to each external circuit 51.

This monitoring process would include comparing the magnitude of the monitored amperage to the value indicating the magnitude of the predetermined amperage and, detecting whenever the magnitude of the monitored amperage exceeded that of the predetermined amperage. Should such a excessive electrical condition be detected, the CPU 20 would coordinate the electronic procedure for disconnecting the external circuit 51 from the power source 50. At this point, it is necessary for human intervention to perform the step of removing or remedying the overload condition so that normal and safe operation of the power distribution circuit may resume. Alternatively, it could automatically re-set to a pre-determined value. This could happen a pre-determined amount of times, and thereafter, human intervention would be required. Once the faulty overload condition is rectified, it is permissible to safely reconnect the external circuit 59 to the power source 50.

By looking at the amperage (shown on the metering device) required by the unit, the operator could manually reprogram (not to exceed 30 amps) a higher value on the keypad, i.e., the predetermined value of a fuse is ten amps. The fuse keeps shutting off. The metering device shows that the unit on that fuse is using 12.5 amps before shutting down fuse. The operator could then reprogram that fuse for 14 amps. Now that fuse should not shut off again and is still far below the 30 amp maximum value allowed.

This does not mean that this reprogramming cannot be automatic. If automatic and the same conditions were present the fuse would automatically be risen in value from ten amps to possible 14 amps depending on what the automatic system is allowed to add to what is needed. It could do this as long as the value did not exceed 30 amps.

Additional steps in this method may include the visual display on display 60 of the magnitude of the monitored amperage or the amperage level which the external circuit 51 cannot safely exceed. Also, should an unsafe overload arise, it might be preferable actuate a visual or auditory alarm. Should the electronic fuse box 10 be incorporated as part of the electrical system of an automobile, it might be advantageous to warn the driver though the use of a light emitting diode, dashboard bulb or some other form of indicator light 111, on dash board 110 as is practiced in the art. Further prior to the initiation of any of these steps, it may first be required to install or otherwise retro-fit or initially install the electronic fuse box 10 into the external circuit 51 for which protection is desired. Such installation would comprise a necessary step prior to any programming or reconfiguring of the electrical safety system.

Having thus described the invention in detail, it is to be understood that the foregoing description is not intended to limit the spirit and scope thereof. What is desired to be protected by the Letters Patent is set forth in the appended claims.

What is claimed is:

1. An apparatus for protecting a circuit from excessive electrical amperage comprising:

retro-fit means for electrically connecting the apparatus to an existing fuse box;

a means for programmably inputting a value indicating a magnitude of a predetermined amperage;

a means for storing the value indicating the magnitude of the predetermined amperage;

a means of monitoring the magnitude of an electrical amperage traveling from a power source to a circuit;

a means for comparing the magnitude of the monitored amperage to the value indicating the magnitude of the predetermined amperage;

a means for detecting when the magnitude of the monitored amperage exceeds the value indicating the magnitude of the predetermined amperage;

a means for disconnecting the circuit from the power source should the magnitude of the monitored amperage exceed the value indicating the magnitude of the predetermined amperage;

a means for reconnecting the circuit to the power source.

2. The apparatus of claim 1 further comprising means for visually displaying the magnitude of the monitored amperage.

3. The apparatus of claim 1 further comprising means for visually displaying the magnitude of the predetermined amperage.

4. The apparatus of claim 1 further comprising means for actuating an auditory alarm whenever the magnitude of the monitored amperage exceeds the value indicating the magnitude of the predetermined amperage.

5. The apparatus of claim 1 further comprising means for actuating a visual alarm whenever the magnitude of the monitored amperage exceeds the value indicating the magnitude of the predetermined amperage.

6. The apparatus of claim 5 wherein the visual alarm is comprised of an indicator light displayed on the dashboard of an automobile.

7. The apparatus of claim 1 wherein the predetermined amperage is described by a programmable input device indicating a magnitude of electrical current that cannot be safely exceeded.

8. The apparatus of claim 7 wherein the means for inputting a value indicating a predetermined amperage is a keypad having depressible alphanumeric and data entry keys.

9. The apparatus of claim 1 further comprising an absolute maximum allowable value of amperage that can be programmed.

10. The housing of claim 1 further comprising electrical contact points which are positioned to permit installation or retro-fitting the apparatus within an existing fuse panel receptacle.

11. An method for protecting a circuit from excessive electrical amperage comprising the steps of:

interconnecting a programmable electric fuse box with an existing fuse box;

programmably inputting a value indicating a magnitude of a predetermined amperage;

storing the value indicating the magnitude of the predetermined amperage;

monitoring the magnitude of an electrical amperage traveling from a power source to a circuit;

comparing the magnitude of the monitored amperage to the value indicating the magnitude of the predetermined amperage;

detecting when the magnitude of the monitored amperage exceeds the value indicating the magnitude of the predetermined amperage;

disconnecting the circuit from the power source should the magnitude of the monitored amperage exceed the value indicating the magnitude of the predetermined amperage;

removing the condition which created the electrical overload; and reconnecting the circuit to the power source.

12. The method of claim 11 further comprising the step of visually displaying the magnitude of the monitored amperage.

13. The method of claim 11 further comprising the step of visually displaying the magnitude of the predetermined amperage.

14. The method of claim 11 further comprising the step of actuating an auditory alarm whenever the magnitude of the monitored amperage exceeds the value indicating the magnitude of the predetermined amperage.

15. The method of claim 11 further comprising the step of actuating a visual alarm whenever the magnitude of the monitored amperage exceeds the value indicating the magnitude of the predetermined amperage.

16. The method of claim 11 wherein the predetermined amperage is entered via a programmable input device indicating a magnitude of electrical current that cannot be safely exceeded.

17. The method of claim 16 wherein the predetermined amperage is entered on a keypad by depressing alphanumeric and data entry keys.

18. The method of claim 11 further comprises the step of establishing an absolute maximum value of amperage that can be programmed.

19. The method of claim 11 further wherein the step of interconnecting the programmable electric fuse box with an existing fuse box comprises inserting the housing and its electrical contact points with the cavities of a fuse receptacle.

20. The method of claim 18 wherein the absolute maximum allowable amperage is set in accordance with the application and the maximum allowable amperage for automobile application is set at 30 amperes.

* * * * *